US004001714B2

United States Statutory Invention Registration [19]

[11] Reg. Number: H1714

[45] Published: Mar. 3, 1998

Partridge, III

[54] AUTOMATIC STILL IMAGE TRANSMISSION UPON CALL CONNECTION

[75] Inventor: B. Waring Partridge, III, Far Hills, N.J.

[73] Assignee: Lucent Technologies Inc.

[21] Appl. No.: 434,079

[22] Filed: May 3, 1995

[51] Int. Cl.[6] ..... H04N 7/14

[52] U.S. Cl. ..... 348/14; 348/13; 379/93.01; 379/93.17

[58] Field of Search ..... 348/14, 15, 16, 348/17, 18, 19; 379/96, 100, 93, 94, 98, 97

[56] References Cited

U.S. PATENT DOCUMENTS

| | | | |
|---|---|---|---|
| 4,924,303 | 5/1990 | Brandon et al. | 358/86 |
| 4,943,855 | 7/1990 | Bheda et al. | 358/133 |
| 4,962,521 | 10/1990 | Komatsu et al. | 379/53 |
| 5,042,061 | 8/1991 | Kaneko et al. | 379/53 |
| 5,046,079 | 9/1991 | Hashimoto | 348/14 |
| 5,192,999 | 3/1993 | Graczyk et al. | 379/100 |
| 5,282,243 | 1/1994 | Dabbaghi et al. | 379/201 |
| 5,305,097 | 4/1994 | Sato et al. | 348/14 |
| 5,412,418 | 5/1995 | Nishimura et al. | 348/14 |
| 5,414,457 | 5/1995 | Kadowaki et al. | 348/14 |

*Primary Examiner*—Bernarr E. Gregory

[57] ABSTRACT

The present disclosure describes a system and method for selecting and transmitting a still image in a telephone network. A series of images is stored in at least one storage unit coupled to the network, each image associated with a particular customer in the network. Upon the placement of a call, the system will automatically select and transmit the calling party's image to the called party's video telephone or terminal prior to or during the ringing sequence, or after the calling party has answered.

20 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

AUTOMATIC STILL IMAGE TRANSMISSION UPON CALL CONNECTION

BACKGROUND OF THE INVENTION

This invention relates to image transmission in a telecommunications network, and more particularly to automatic still image selection and transmission upon the placement of a call to a video telephone or terminal.

Various forms of video telephones, multimedia terminals and related image transmission systems have been introduced in recent years and are in use today using standard telephone networks. Customers with the right equipment (voice/camera/screen units) can communicate by image as well as by voice, although often with some compromise in picture resolution or image transmission speed due to bandwidth limitations in some areas of the network. A video telephone system is disclosed, by way of example, in Komatsu et al. U.S. Pat. No. 4,962,521.

To partially compensate for limitation in network bandwidth, various data compression and other schemes have bee proposed. Nevertheless, image "jerkiness" and some delay are still the characteristics of today's video telephones. In addition, the called party normally is not able to view the image of the calling party before the call is answered, which means that calls cannot be screened on the basis of incoming visual information. Brandon et al. U.S. Pat. No. 4,924,303 discloses a system for interactive retrieval of still frame video images, but the system requires the use of a separate television transmission system and standard television receivers to view the image, and is not designed to display the image immediately upon telephone call connection.

SUMMARY OF THE INVENTION

Although "caller ID" equipment now permits call screening based on the calling party's number, a useful extension of this concept would be a system that permitted call screening based upon the calling party's image, whether it be the image of a person, a corporate logo or other image preselected by the calling party as a type of telephonic "calling card".

A further useful extension of caller ID and related features would be a system located within a telephone network (either in a central office or elsewhere) that stored and maintained for immediate transmission a large data base of images preselected by all users in the network, which system would automatically select and transmit to the called party an appropriate image (such as of the calling party) as soon as an initial connection has been established.

In accordance with the present disclosure, customers with telecommunication equipment that can receive images are provisioned to receive an image in association with a call. The image is delivered from an image node within a telecommunication network. Each image is associated with the telephone number of a customer in the network.

In one embodiment, upon detection of an initiated call, the telecommunication system accesses the image node, selects an image associated with the calling party, and transmits the selected image to the called party, as appropriate. The transmission occurs before, during or after the called party's terminal has begun to ring. In this way, the image appears (or at least begins to appear) at the called party's terminal even before the called party has taken the receiver off-hook or otherwise answered the call. After the called party has answered, the calling party's image may continue to be transmitted, if necessary, until maximum resolution at the called party's terminal has been reached.

If the calling party's equipment has image transmission capability, as the call continues, the image may be periodically or continually refreshed with "live" image data received from the calling party's terminal.

DETAILED DESCRIPTION

Figure 1:
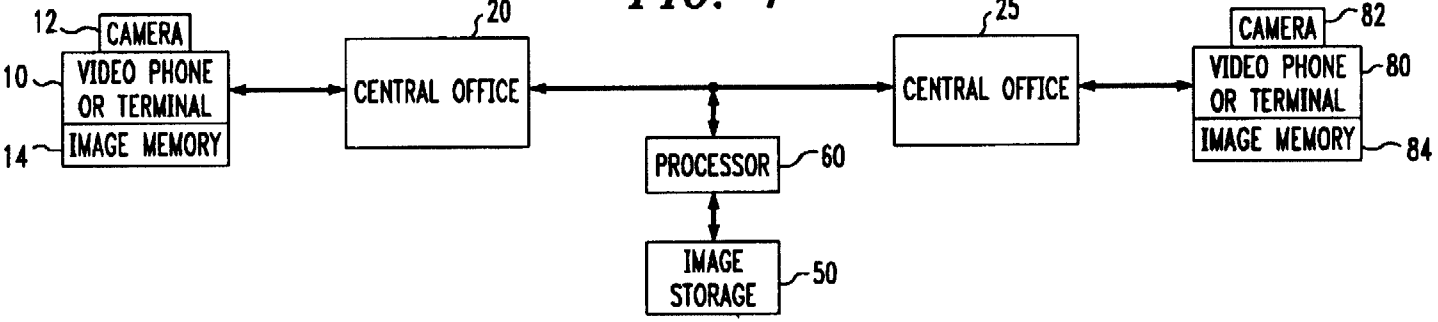
FIG. 1 is a block diagram of one embodiment of the invention.

FIG. 1 shows a simplified version of a conventional telephone network including central office switches 20 and 25. Terminals 10 and 80, which may be equipped with a screen and which may also include a camera 12, 82, respectively, and a local image memory unit 14, 84, respectively, for storing still frame images captured by the camera, are connected to switches 20 and 25 respectively. None of the elements 12, 14, 82 and 84 is required.

As used in this disclosure, "image" means any visual material capable of being depicted on a screen.

Once switching and other circuitry within a central office has identified the calling terminal and called terminal, an available path then is located and a connection is established between both terminals, which may then be followed by the generation and transmission of a ring signal to the called terminal. If both terminals are capable of image communication, a direct image connection will then normally be established as soon as the called party answers. It is important, however, to note that the present disclosure does not require the establishment of a direct visual communication link between the two terminals; only the establishment of a visual link to the called terminal.

In accordance with the present disclosure, at least one image processor 60 is included within the network of FIG. 1. The location within the network is not critical; processor 60 could be located almost anywhere, either as a stand-alone unit or within one of the central offices, as long as a visual communication link can be established between the processor that services the calling terminal and the called terminal 80. Processor 60 is described in more detail below.

Also, in accordance with the present disclosure, coupled to processor 60 is an image storage unit 50 for storing a database of preselected, digitized images. Storage unit 50 may be any conventional mass storage memory device such as a disk drive or server, and the images may be any still (video or otherwise) images.

In normal operation, it is anticipated that image storage unit 50 will contain a database of images preselected by the customers served by processor 60. For example, each customer may preselect an image that he, she or it wishes to be stored in the database as a "telephone calling card" or greeting card that may be used to identify the caller. In addition, a corporate customer may desire to store a corporate logo or other image to identify the corporate entity upon the placement of a call. More than one image, such as a corporate presentation slide show, may, of course, be selected by each customer and stored in the database depending on the capabilities of the image storage unit 50 and processor 60. It is anticipated that images typically will be stored in the database at the customer's direction either prior to the placement of a call or perhaps at an "off peak"

time when no particular call is being placed but the customer desires to update his, her or its image for future use.

The image transmission system (processor 60 with image storage 50 or otherwise) would, most likely, be closely tied to the manner of generating the electronic signals that represent the image in an electronic image file. One readily available mechanism (and associated coding and protocol) is facsimile (fax). Either black-and-white or color fax can be used to create the electronic image file. Another mechanism is electronic mail for sending a file previously created by a document/ image scanner. For example, a conventional photograph of a customer could be scanned by the customer (either personally or by a third party) and then sent to the image transmission system, or the customer could make other arrangements for a digitized image (perhaps generated by an electronic camera) to be sent.

Of course, any conventional facsimile or electronic mail format can be employed to transmit the image data to the image transmission system, and such data can be kept in the image storage 50 either in the transmitted format or in some other preselected format.

Also, just as image sequences can be stored, as indicated above, to provide a slide shown, a selectable plurality of images can be stored which allows each user to customize his, her or its image(s) to the called party. Selection of images is achieved by the calling party sending a control signal, for example at the end of the called number sequence. The sequence may be, for instance, "#9" for business attire and "#8" for beach attire. With another controlled sequence, such as "#99", the customer can cause processor 60 to block transmission of all images.

The data contained within database 50 need not be only image data. For example, associated with each image could be test characters such as the name of the person associated with the image, the telephone number or other identifying information, or a visual or voice greeting. In addition, associated with a corporate logo image could be an advertising message or some other corporate "calling card" type message that would appear on the screen of the called party upon call connection. Such a message could also be aural.

Returning to processor 60 (FIG. 1), this element, in a preferred embodiment, comprises a general purpose digital computer, a microprocessor or digital signal processor that performs several functions. First, processor 60 generates a unique signal immediately upon detection of an incoming call from central office 20 that identifies the particular calling terminal (in this case terminal 10). The processor could either make such determination directly using automatic number identification (ANI) or "caller ID" means, or processor 60 could generate a signal in response to a number-identification signal generated elsewhere in the network, such as by an ANI unit in central office 20. In either case, the signal generated by processor 60 is used to locate the address of the customer image data, stored in image storage unit 50, that is associated with the particular calling terminal. Such image data could be unique to that particular terminal, or could be shared among several terminals. Once located, the data is read out of the image storage unit by processor 60 and automatically sent through the network to the called terminal 80 immediately upon the establishment of an available path (network line) to called terminal 80 by switching circuits in central office 20 or 25. Data may be read out directly, or encoded in some fashion, depending upon the capabilities of the receiving terminal and of the network. Processor 60 could be programmed to begin transmission of the image data at any of several times in the calling sequence, such as (1) immediately upon the establishment of an available path to the called terminal (even prior to first ring); (2) simultaneously with the transmission of the first ring signal; (3) some period of time before or after the transmission of the first ring; (4) immediately upon detection of an off-hook condition at the receiving terminal (i.e., upon answer); or (5) some period of time after off-hook has been detected.

Figure 2:
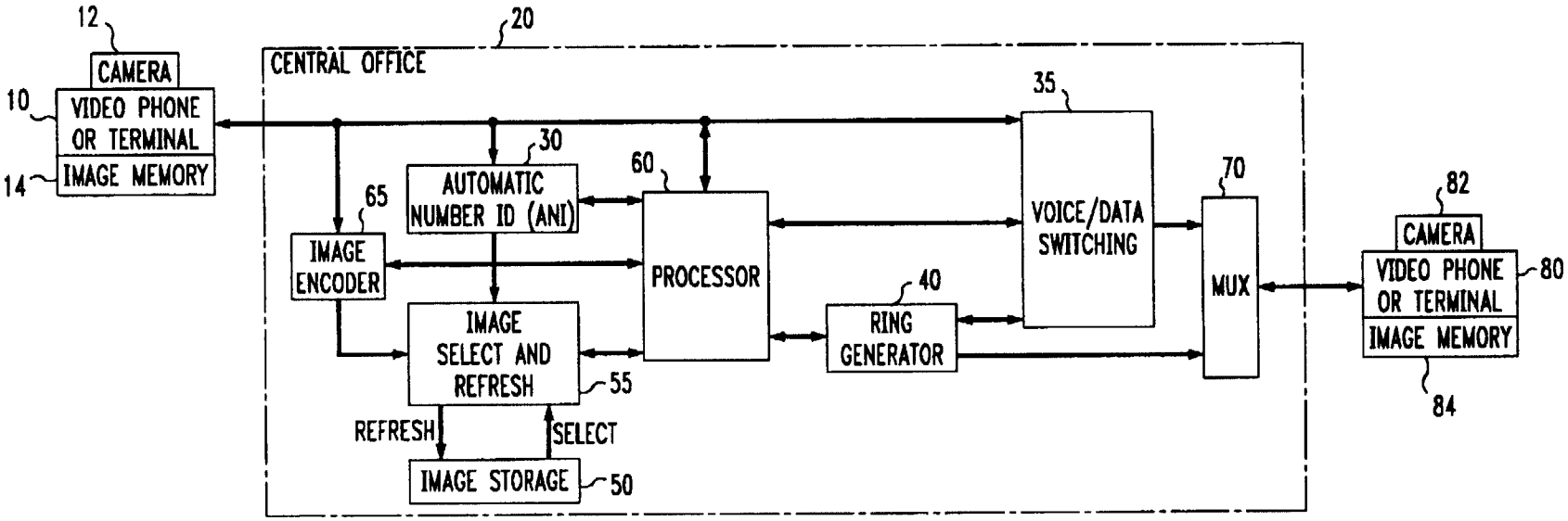
FIG. 2 is a block diagram of another embodiment of the invention.

Another embodiment of the invention is shown in FIG. 2. In FIG. 2, a central office 20 of a conventional telephone network contains conventional telephone switching circuits 35 for voice and data transmission over the network. A plurality of individual customer video telephones, personal computers or other conventional voice/ image terminals 10, 80 are connected to the central office. As in FIG. 1, it is assumed that terminal 10 is a calling party's terminal and terminal 80 is a called party's terminal.

A voice/ data switching circuit 35 for establishing a connection between the calling terminal and the called terminal, and an automatic number identification (ANI) unit 30, for identifying the particular phone number of an incoming call to the central office, are typically found within the central office 20. In addition, a ring generator 40 typically will be coupled to the switching circuit to generate a conventional ringing signal as soon as the switching circuit has established a connection to a called party's terminal 80.

In accordance with the embodiment of FIG. 2, there is also located within the central office an image storage unit 50 for storing a database of digitized images. Each customer or terminal may be assigned at least one image. Such images could either be preselected by customers, or could be selected from a set of acceptable or pre-approved alternatives. It should also be understood, that storage unit 50 need not be physically located within the central office but may be elsewhere in the network, as in FIG. 1.

Coupled to storage unit 50 and to ANI 30 is an image select and refresh unit 55. Image select and refresh unit 55 may be a conventional table look-up or other addressing device under hardware or software control, the primary function of which is to address the storage unit 50, upon receipt of a signal from ANI 30 and under control of at least one processor 60, to select a particular portion of image data that is associated with the telephone number identified by ANI 30.

A secondary function of image select and refresh unit 55 is to cause current or "live" image data to be written into storage unit 50 upon receipt of a signal from the calling party at terminal 10. Such data could, for example, represent a recent still frame image captured by camera 12 during a conversation, or could represent a different image in a series of preselected images, such as in a slide show during a corporate presentation.

As shown in FIG. 2, coupled to the input of image select and refresh unit 55 is an optional image encoder 65. The function of image encoder 65 is to encode or convert the customer images into compact or compressed digital data sets that are better suited to transmission over a telephone network of limited bandwidth. Image encoder 65 may, for example, be comprised of a system such as that shown in Bheda et al. U.S. Pat. No. 4,943,855, which is hereby incorporated by reference. Decoding of the data stream may be accomplished at the called party's terminal 80 to reconstruct the image. Image encoder 65 is not, of course, required if network bandwidth and terminal capacity are such that image transmission can take place without compression.

Further elements of FIG. 2 include a multiplexer 70 coupled to image encoder 65 and switching circuits 35, and a processor 60 coupled to the image encoder, to image select and refresh unit 55, to ANI 30, to switching circuits 35 and to ring generator 40. The function of processor 60 is to control the sequence and timing of image data addressing, refreshing, encoding, and transmission, as will be described in more detail below. The function of multiplexer 70 is to enable the multiplexed transmission of image data with the ring and voice signals, as will be described in more detail below.

The operation of the present disclosure will now be described, with particular attention to FIG. 2. First, a calling party at terminal 10 places a call in an attempt to reach a party at terminal 80. In conventional fashion, incoming dialed digits are received within the central office 20. Upon completion of the dial sequence, the incoming number is identified by ANI unit 30, the dialed terminal 80 is identified by switching circuits 35, and the switching circuits attempt to locate an available path and establish a network link to the dialed terminal. Upon locating an available path and determining that the dialed terminal is connected and in an on-hook condition, the switching circuits initiate a ring sequence through ring generator 40, which sequence continues until the called party answers.

In accordance with FIG. 2, as soon as the number of the calling terminal has been identified by ANI unit 30, a signal is sent to image select and refresh unit 55 that initiates an addressing sequence to locate within image storage unit 50 the appropriate portion of image data (whether one frame or a series of frames) that is associated with the calling number. This addressing sequence may take place simultaneously with, before or after the network link has been established and the ringing sequence has begun. In a preferred embodiment, the addressing sequence is begun immediately upon identification of the calling terminal's number, so that the processing of image data may begin as quickly as possible.

Upon locating the image data associated with the calling terminal, image select and refresh unit 55, under the control of processor 60, reads the data out of storage unit 50 for sending over the network.

As soon as an available path has been located and a connection to the called terminal has been established by switching circuit 35, a ring sequence is normally initiated by ring generator 40. In accordance with the present disclosure, as soon as processor 60 detects that switching circuits 35 have established a link between the calling and called terminals, processor 60 begins to transmit, or to prepare the image data for transmission, over the link. This transmission could begin even before ring generator 40 transmits the first ring signal to called terminal 80, or it could be done simultaneously with the first ring or after a preselected number or rings. In one embodiment, image transmission is begun prior to the first ring, to enable an image to be formed at the called terminal as quickly as possible. In another embodiment, processor 60 multiplexes the image data with the ring signal through multiplexer 70 over the connected line to terminal 80, beginning with the first ring. After the called party has answered, and if the image data has not yet been completely transmitted, the image data will be multiplexed with voice signals, and will continue to be transmitted, under the control of processor 60.

At or prior to the beginning of the ringing sequence, processor 60 begins transmitting data in conjunction with the ring signal generated at ring generator 40 through multiplexer 70 to the called party at terminal 80. Depending upon available bandwidth in the network, the received image initially may have a course resolution, and then later become finer and finer. Alternatively, a fine-resolution image may appear at the called terminal at a speed compatible with the available bandwidth. As the ringing continues, the image received at terminal 80 may be updated with refreshed image data, if such data has been received into image storage unit 50 from the calling terminal or another source in the interim. This refreshed image may, unless blocked by the calling party, be a series of still images continuously or periodically transmitted from the calling party's terminal 10 to database 50. The refresh rate is, of course, dependent upon the bandwidth of the network as well as the speed of the processor 60 and image encoder 65.

In another embodiment of the invention, an image post-processor (not shown) may be coupled between processor 60 and an optional multiplexer 70 in FIG. 2 to add additional image processing functions prior to transmission over the network. For example, the image may be translated or reformatted so as to be compatible with the particular transmission media being employed at the time. In addition, data may be added to or subtracted from the image under the control of processor 60, such as a voice greeting, a name, phone number or a visual greeting. Also, the image may or may not be sent in conjunction with a ring signal.

One of the advantages of the present disclosure is the ability of the system to alert the called party to the image of the calling party very early in the calling sequence. The image could be displayed at the calling party's terminal even before the first ring is sounded at the calling party's terminal. Alternatively, the image could appear on the screen simultaneously with the first ring or with some subsequent ring, at some predetermined interval after the ringing has begun, or after the called party has answered. This allows the called party to screen the call depending upon the particular image, which advantageously permits the called party to dispense with the need to memorize the telephone numbers of calling individuals. In addition, by starting image transmission prior to or during ringing, it is likely that, by the time the called party has answered the call, enough time will have elapsed to permit the system to transmit and reconstruct a relatively high-resolution image at the called terminal, even if network bandwidth is limited.

Thus, there is disclosed a system for selecting and transmitting a still image in response to an incoming call from a terminal or video phone and transmitting such image to the called party immediately upon the establishment of a network link between the calling party to the called party. It should, of course, be understood that while the present disclosure has been described in reference to illustrative embodiments, other arrangements may be apparent to those of ordinary skill in the art. For example, image storage unit 50 could be located anywhere in the network or even within the called terminal 80 or the calling terminal 10, depending upon the amount of memory available. Such local storage could store a subset of images customized for that particular terminal, such as images of frequent callers.

I claim:

1. An image transmission system comprising:

memory for storing image data;

at least one processor coupled to said memory; and connection means interposed between said processor and a telecommunications network to which a called party and a calling party are coupled, that is adapted to transmit signals from said memory to said called party, where said processor, in response to signals received from said calling party that request connection to said called party, retrieves image data from said memory and forwards said image data to said connection means.

2. The system of claim 1 in which said called terminal comprises a video telephone.

3. The system of claim 1 in which said network comprises a telephone network.

4. The system of claim 1 in which said image data comprises preselected portions of data, each portion associated with a calling terminal.

5. The system of claim 4 in which each said portion is transmitted to said memory via facsimile.

6. The system of claim 4 in which each said portion is transmitted to said memory via electronic mail.

7. The system of claim 1 in which said transmission of said image data occurs simultaneously with a ring signal.

8. The system of claim 1 in which said transmission of said image data occurs prior to a first ring signal.

9. The system of claim 1 in which said image data is selected by said calling party prior to transmission to said called party.

10. The system of claim 9 in which said image data is selected by the calling party using a predetermined code.

11. The system of claim 1 in which said image data is stored in said memory in a preselected facsimile format.

12. The system of claim 1 in which said image data is stored in said memory in a preselected electronic mail format.

13. An image selection and transmission system comprising:

identifying means coupled to a telephone network for identifying a calling terminal and a called terminal;

switch means coupled to said network for establishing a ring connection to said called terminal and a visual communication connection between said calling terminal and said called terminal;

storage means coupled to said network for storing preselected portions of image data, each portion associated with one said calling terminal;

selector means coupled to said identifying means and to said storage means for selecting a portion of said image data associated with said calling terminal upon receipt of a signal from said identifying means; and processor means coupled to said coding means, to said identifying means and to said switch means for automatically initiating a flow of said data stream to said called terminal upon the establishment of said ring connection, and for continuing the flow of said data stream upon the establishment of said communication connection.

14. The system of claim 13 in which said flow of said data stream is initiated prior to the generation of a first ring signal during said ring connection.

15. The system of claim 13 in which said flow of said data stream is completed prior to the generation of a first ring signal during said ring connection.

16. The system of claim 13 further including coding means coupled to an input of said selector means for encoding said image data prior to storage in said storage means.

17. The system of claim 13 in which said calling terminal is arranged to permit a calling party to block transmission of said data stream.

18. A method of selecting and transmitting an image to a terminal over a telephone network, comprising the steps of:

storing images in a database, each image associated with a terminal in said network;

identifying a terminal that is attempting to establish a connection to another terminal in said network;

selecting the image that is associated with said calling terminal;

establishing a connection between said calling terminal and said called terminal; and initiating transmission of said data stream to said called terminal over said network upon the establishment of said connection.

19. The method of claim 18, in which said transmission of said data stream precedes the transmission of a ringing signal.

20. The method of claim 18 further including the step of encoding said images prior to storing said images in said database.

* * * * *